Figures 1, 2:
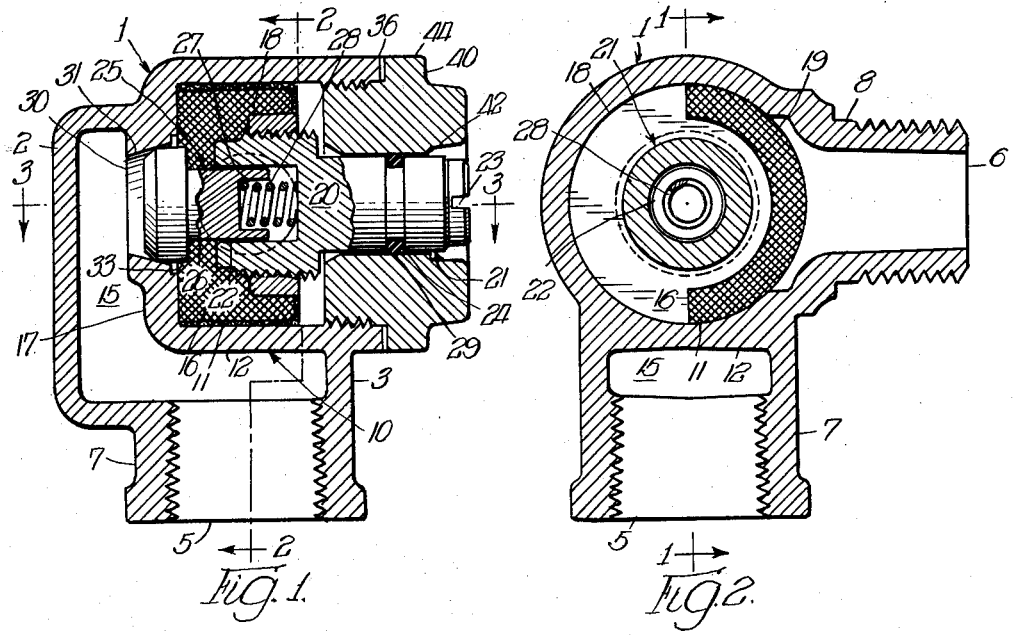

July 16, 1963 C. H. PRIESMEYER 3,097,660
CHECK VALVE WITH REMOVABLE FILTER
Filed Aug. 5, 1960

INVENTOR.
Charles H Priesmeyer,
BY
Byron, Hume, Groen + Clement.
attys.

United States Patent Office 3,097,660
Patented July 16, 1963

3,097,660
CHECK VALVE WITH REMOVABLE FILTER
Charles H. Priesmeyer, Wilmette, Ill., assignor to The Powers Regulator Company, Skokie, Ill., a corporation of Illinois
Filed Aug. 5, 1960, Ser. No. 47,706
2 Claims. (Cl. 137—316)

This invention relates to an improved check valve and specifically to an adjustable check valve having an outlet compartment which may be opened for periodic maintenance without the necessity of shutting off or diminishing the pressure of fluid supplied to the valve inlet.

In general, this novel improvement is achieved by mounting an axially-adjustable valve on a support provided within the outlet compartment, thereby making it possible to close the valve solidly for shutting off the flow of fluid therethrough regardless of supply pressure. This facilitates removal of a cover from the outlet compartment for maintenance purposes such as cleaning or replacing a filter element.

Fundamentally, a check valve is a device normally preventing or inhibiting the flow of fluid therethrough in one direction, but operable automatically in response to unidirectional fluid pressure in excess of a predetermined magnitude to permit fluid flow in another direction. When such valves are designed to permit unidirectional fluid flow only after a predetermined magnitude of fluid pressure is applied, they are referred to as pressure-relief valves.

In the past check valves have been applied in many ways. Some of the more common uses have been to provide a pressure-relief device to safeguard fluid systems from rupture or explosion as the result of excessive pressures therein, for maintaining a predetermined fluid level or pressure in various containers, for isolating one portion of a hydraulic system from spurious pressure fluctuations occurring in another portion of the system, and for insuring that fluid withdrawals will not be made from a system until pressure exceeds a predetermined minimum.

In many applications, however, the fluid contains particles of foreign matter which adversely affect the system or portions thereof supplied by the valve. As a result, it is necessary to strain or filter these materials from the fluid before they reach the parts of the system likely to be influenced harmfully thereby. This can be done, of course, through installation of a suitable filter unit at any appropriate location in the fluid line. However, such filter units must be serviced or cleaned periodically and, for this reason, the locations where they can be installed are limited to those which facilitate access.

Heretofore, it has been customary to provide a separate housing for filter units, together with an auxiliary valve making it possible to cut off fluid in order to service the filter unit. This practice has been found to be unsatisfactory, however, where stringent design requirements have been imposed on account of limitations in weight, installation space, configuration, and pipe routings for the system. In such instances, it has been difficult, if not impossible, to use separate filter and auxiliary valve units and remain within limitations of cost or weight specified for the system, or to locate filter units where they readily will be accessible for maintenance.

In accordance with this invention, the disadvantages and problems arising from the prior art practice of providing a separate filter unit and auxiliary valve are resolved by including the filter as part of a novel check valve structure. Hence, this invention makes it feasible to eliminate two space-consuming, troublesome, expensive, and heavy components which otherwise would be required in a fluid system of conventional design.

From the foregoing, it should be apparent that the principal objects of this invention are:

(1) To provide a check valve having an outlet compartment which can be opened for maintenance operations without the necessity of shutting off or diminishing the pressure of fluid supplied to the valve inlet;

(2) To provide a filter-equipped check valve, thereby eliminating the necessity of providing in a system where such check valve is installed a separate filter unit and auxiliary cut-off valve therefor;

(3) To provide a check valve having a filter-equipped output compartment accessible for cleaning and maintenance without the necessity of cutting off or diminishing the pressure of fluid supplied to the valve inlet port;

(4) To eliminate excess weight, conserve space and simplify the design of fluid systems; and (5) To provide means of superior economy and engineering simplicity for effectuating the foregoing objects.

An exemplary embodiment of this invention comprises a valve casing having inlet and outlet ports, a partition in said chamber between said ports to form inlet and outlet compartments, a valve port having a valve seat in said partition, a filter element disposed in said outlet compartment for filtering fluid passing through said outlet port, means in said valve casing permitting access to said outlet compartment for cleaning or replacing said filter element, a valve-stem assembly characterized by resiliency in the direction of its longitudinal axis, and means for mounting said assembly for axial movement toward and away from said valve seat such that the valve of said assembly either may be adjusted to engage said valve seat in sealing relation whenever the pressure of a fluid supplied through said inlet port is less than a predetermined magnitude, or to hold said valve firmly against said valve seat regardless of the magnitude of fluid pressure, such that said outlet compartment may be opened and maintenance operations performed with respect to the interior thereof without the necessity of cutting off or diminishing the pressure of fluid supplied to said inlet port.

The foregoing paragraphs are intended to summarize and explain the significance of this invention in relation to the problems which it resolves, and should not be construed as limiting the scope of protection defined by the claims set forth hereinafter.

The aforementioned objects will be apparent upon reading of the specification with reference to the following drawing.

Figure 3:
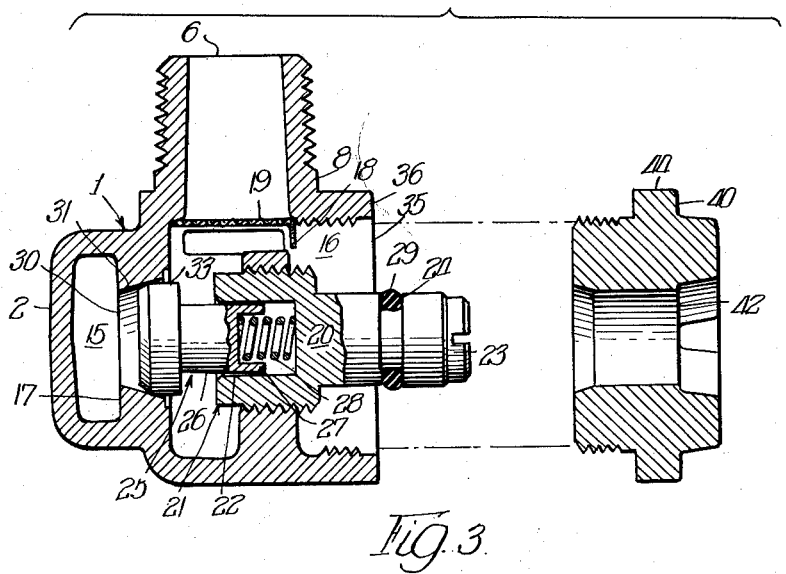

In the drawing:

FIGURE 1 is principally a sectional representation taken along the plane 1—1 in FIGURE 2, of the valve in accordance with this invention, portraying a cross section of the valve casing along a plane containing the respective axes of the valve and inlet ports, and a partial section of the valve-stem assembly;

FIGURE 2 is a sectional representation taken along the plane 2—2 of FIG. 1, showing the relative orientations of the outlet and inlet ports, the support for the valve-stem assembly, and the filter-equipped outlet compartment; and FIGURE 3 is a sectional representation taken along the plane 3—3 of FIG. 1, wherein the outlet compartment is shown open, and the valve-stem assembly is shown in partial section.

As represented in FIGS. 1 and 2, a check valve in accordance with this invention generally comprises a valve casing 1 having inlet and outlet ports 5 and 6, respectively, a partition 10 disposed between the inlet and outlet ports to form inlet and outlet compartments 15 and 16, respectively, a resilient valve-stem assembly 20 mounted within the outlet compartment for axial movement toward and away from a valve port 30 provided in partition 10, and a service, or access, port 35 (FIG. 3) in the wall of casing 1 provided with a removable cover 40 for access to the interior of outlet compartment 16 for maintenance purposes whenever the valve-stem assembly 20 is moved axially toward the valve port 30 until it unyieldingly seals its opening against the entry of fluid from inlet compartment 15.

With reference principally to FIGS. 1 and 2, the valve casing 1 may comprise a casting made of a corrosion-resistant material having the strength characteristics and wall dimensions required to withstand the pressure of fluid to be confined therein. The corners and edges of valve casing 1 are rounded to increase their strength to facilitate handling, and to minimize the likelihood of damage to objects which may be bumped inadvertently against the casing while being moved about in its vicinity.

One end wall 2 of valve casing 1 is closed, but the other end wall 3 is provided with a circular service port (FIG. 3) normally closed by the cover 40. An inlet port 5 having internal threads in collar 7 for engaging mating threads of a fluid supply pipe (not shown) is provided in one of the narrow sidewalls. The outlet compartment 16 is substantially cylindrical in shape and has a longitudinal axis parallel to the longitudinal axis of valve casing 1. An outlet port communicating with the compartment 16 and having an axis perpendicular to the axis of inlet port 5 is provided in a wall of valve casing 1 common to outlet compartment 16. As represented in FIGS. 2 and 3, the collar 8 of outlet port 6 may be threaded externally to mate with internal threads of the discharge pipe or coupling thereto (not shown). Instead of threading the collars 7 and 8 of inlet and outlet ports 5 and 6, respectively, they may be constructed in any manner suitable for connection to the supply and discharge lines. A valve port 30 having a beveled valve seat 31 facing in the direction of fluid flow is provided in the end wall 17 of outlet compartment 16. The outlet side 11 of the longitudinal section of partition 10 is curved to form the cylindrical interior wall surface of the outlet compartment 16, whereas the inlet side 12 of the longitudinal section of partition 10 is substantially flat, thereby providing for the partition a cross section of high strength to oppose the fluid supply pressure as shown in FIG. 2. The space within valve casing 1 unoccupied by cylindrical outlet compartment 16 constitutes an L-shaped inlet compartment 15 communicating between the inlet port 5 and the valve port 30 in partition 10.

The cylindrical sidewall of outlet compartment 16 projects beyond the end wall 3 of valve casing 1 to form an annular rim 36 for service port 35 (FIG. 3). The rim 36 may be threaded internally to accommodate the external threads of cover 40. The outer end of cover 40 is provided with an annular flange 44 for engaging the rim 36 when the cover is installed, and an opening 42 through which shaft 21 of valve-stem assembly 20 extends. The rim of flange 44 may be polygonal in shape (not shown) to facilitate the use of a wrench or other tool for removing and replacing cover 40.

The outlet compartment 16 contains valve support 18, filter 19, and valve-stem assembly 20. The valve support 18 is integral with and projects transversely beyond the longitudinal axis of outlet compartment 16 in the direction of outlet port 6. An internally-threaded hole coaxial with the longitudinal axis of outlet compartment 16 is provided in valve support 17 to accommodate mating threads of valve-stem assembly 20 whereby the latter may be moved axially toward and away from valve port 30.

To reduce or eliminate foreign matter or impurities from the fluid discharged from outlet compartment 16, a filter 19 is disposed across the inner opening of outlet port 6. The filter 19 (FIGS. 2 and 3) may be a two-dimensional sieve made of a fine mesh screen, or it may be comprised of a three-dimensional porous collector or other well-known filter material suitable for the intended application. It should be noticed that the effective area of the filter is dependent upon the size of the inner opening of the outlet port 6. Thus, the size of the port 6 should be sufficient that the filter 19 may be used a reasonable length of time before cleaning or replacement becomes necessary.

The adjustable valve-stem assembly 20 (FIGS. 1 and 3) mounted within outlet compartment 16 on valve support 18, and in cooperative relation with valve port 30, automatically checks reverse fluid flow through the valve from outlet to inlet, and checks forward fluid flow from inlet to outlet whenever the supply pressure is below a magnitude predetermined by the resilient thrust exerted by valve-stem assembly 20 against valve port 30. Whenever the supply pressure exceeds the predetermined magnitude, the resilient thrust of valve-stem assembly 20 is overcome and fluid flows forwardly through the valve from the inlet port 5 through the outlet port 6.

In general, the valve-stem assembly 20 comprises a cylindrical shaft 21, a cylindrical valve 25 and a coil spring 28 interposed between telescoped ends of the shaft and valve. The shaft 21 has an enlarged end having external threads mating with the internal threads of valve support 18, a bore 22 having a wall surface slidably engaging the stem 26 of valve 25, a screwdriver slot 23 in its opposite end to enable positioning of the shaft 21 axially toward and away from the valve port 30, and a circumferential groove 24 to accommodate an O-ring gasket 29 for effecting a leakproof rotatable and axially-movable engagement between shaft 21 and the opening 42 in cover 40.

The valve 25 has a stem 26 having a bore 27 in one end to accommodate coil spring 28, and a valve plug 33 on the other end integral with stem 26, and adapted to seat in sealing relation on valve seat 31. The terminal edge of plug 33 is tapered at an angle more acute than the bevel of valve seat 31 to insure a leakproof seal and to minimize the effect of erosion and impurity accumulations which might otherwise cause unwanted leakage.

The dimensions of bore 22, bore 27 and coil spring 28 are selected such that the latter remains under compression whenever the valve-stem assembly 20 is in normal operating position, thereby continually forcing valve 25 axially toward valve seat 31 with a thrust magnitude predetermined by the axial position of shaft 21.

In operation, fluid enters the inlet port 5 and flows via the L-shaped inlet compartment 15 to the valve port 30 where it is checked until the supply pressure becomes sufficient to overcome the bias of the coil spring 28 established, in turn, by preadjustment of the axial position of the valve-stem assembly 20. When the fluid supply pressure exceeds the spring-biasing force tending to maintain the valve plug 33 sealed against the valve seat 31, the fluid pushes the former away from the valve port 30 and flows into the outlet compartment 16, and thence through the filter 19 and from the valve casing 1 through outlet port 6.

In addition to the important feature of adjustability in establishing the pressure at which fluid flow occurs, a valve in accordance with this invention also may be opened for filter cleaning or replacement without the necessity of closing off at some point remote from the check valve or otherwise diminishing fluid pressure in the supply pipe (not shown) coupled to the inlet collar 7. This may be accomplished merely by turning shaft 21 of valve-stem assembly 20 in the direction required to move the latter toward the valve port 30 until the spring 28 exerts sufficient bias to resist the greatest supply pressure likely to be developed, or until the rim of the guide socket 22 bears solidly against the posterior surface of valve plug 33, or until the spring 28 is compressed so as to form a closed helix. Once this adjustment has been made, the cover 40 can be removed from service port 35 (FIG. 3) and maintenance performed in outlet compartment 16 without danger of fluid flow through valve port 30.

It should be apparent that many variations and refinements may be introduced into valves embodying this invention. For example, the guide socket 22 and mating stem 26 of valve-stem assembly 20 may be noncylindrical in shape, or be provided with longitudinal keyways, or otherwise be coupled for nonrotatable axial movement relative to each other. This would make it possible to turn the valve plug 33 against seat 31 whenever the axial position of shaft 21 is readjusted, and at other times, in order to reduce depositions of foreign matter and otherwise insure that leakproof valve seating is maintained. Moreover, valve casing 1 may be designed to have other relative orientations of inlet and outlet compartments and ports; the screwdriver slot 23 may be replaced by a removable handle or handwheel; and service port 35 (FIG. 3) may be located at other positions in the external wall of outlet compartment 16.

I claim:

1. An adjustable check valve comprising: a valve casing having inlet and outlet openings to accommodate the flow of fluid into and out of said casing, respectively, a partition disposed between said inlet and outlet openings to form inlet and outlet compartments, said partition having a valve port and a valve seat, an access opening for said outlet compartment and said outlet opening in the wall of said casing, a transversely projecting support comprising a web extending partially across said compartment in a plane substantially parallel with said valve port so as to define a space between said web and the wall of said casing, said web having an aperture therein substantially aligned with said valve port, a shaft mounted on said support for axial movement, a valve resiliently coupled to said shaft and adapted for sealing engagement with said valve seat, said valve exerting against said valve seat a thrust having a magnitude predetermined by the axial position of said shaft relative to said support, a filter in said outlet compartment effectively disposed across said outlet port, said filter being movable through said space for purposes of inserting and withdrawing said filter in and from said compartment and a removable cover for said access port, said cover having a centrally disposed cylindrical hole engaging said shaft in rotatable, axially movable and fluid tight relation.

2. An adjustable check valve comprising: a valve casing having inlet and outlet openings to accommodate the flow of fluid into and out of said casing, respectively, a partition disposed between said inlet and outlet openings to form inlet and outlet compartments, said partition having a valve port and a valve seat, an access opening for said outlet compartment and said outlet opening in the wall of said casing, a transversely projecting support comprising a web extending partially across said compartment in a plane substantially parallel with said valve port so as to define a space between said web and the wall of said casing including said outlet opening, said web having an aperture therein substantially aligned with said valve port, a shaft mounted on said support for axial movement, a valve resiliently coupled to said shaft and adapted for sealing engagement with said valve seat, said valve exerting against said valve seat a thrust having a magnitude predetermined by the axial position of said shaft relative to said support, a filter in said outlet compartment effectively disposed across said outlet port and at least partially surrounding said shaft, said filter being movable through said space for purposes of inserting and withdrawing said filter in and from said compartment and a removable cover for said access port, said cover having a centrally disposed cylindrical hole engaging said shaft in rotatable, axially movable and fluid tight relation.

References Cited in the file of this patent

UNITED STATES PATENTS

| | | |
|---|---|---|
| 1,551,683 | Muchnic | Sept. 1, 1925 |
| 1,660,777 | Allen | Feb. 28, 1928 |
| 1,799,211 | Brooks | Apr. 7, 1931 |
| 2,246,033 | Cornell | June 17, 1941 |
| 2,567,426 | Ferrari | Sept. 11, 1951 |